Oct. 8, 1940.  J. A. RASMUSSEN  2,217,234
TRAILER HITCH
Filed Sept. 12, 1939
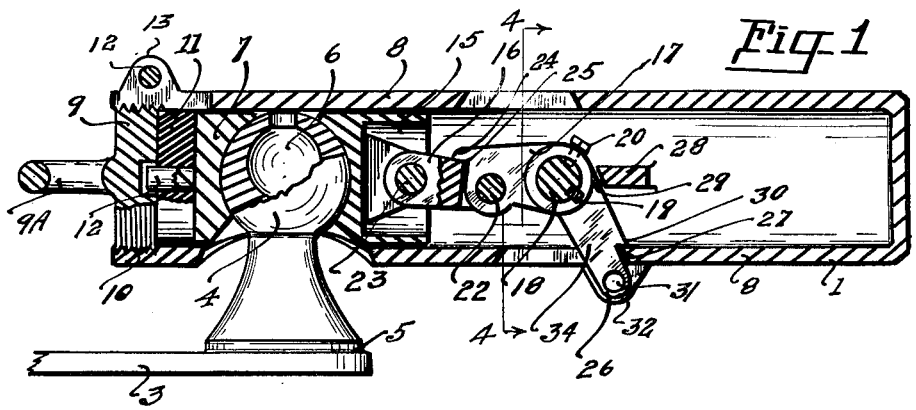
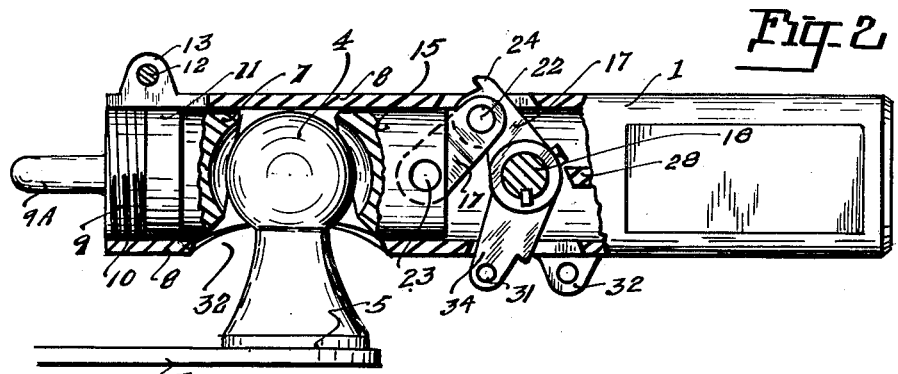
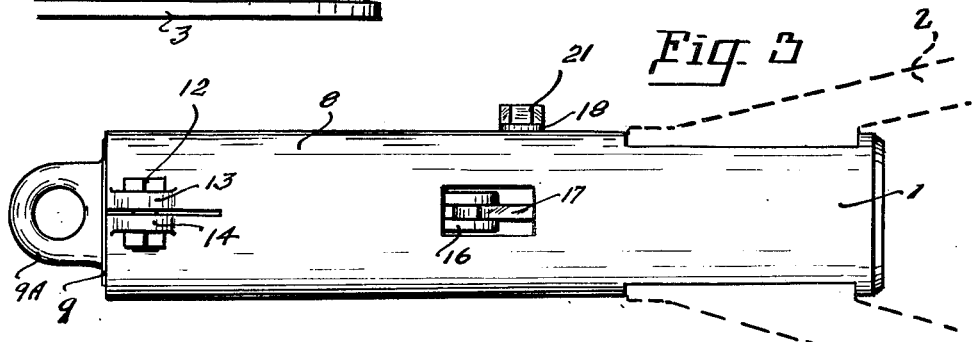
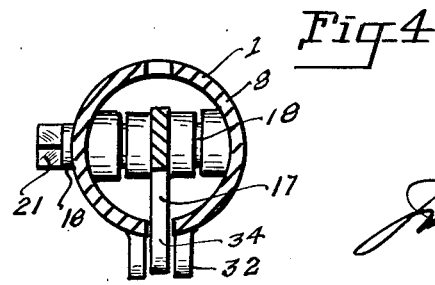
Inventor
John A. Rasmussen
Attorney Patented Oct. 8, 1940

2,217,234

UNITED STATES PATENT OFFICE 2,217,234

TRAILER HITCH

John A. Rasmussen, Salem, Oreg., assignor of forty-nine per cent to Reuben G. Doege, Salem, Oreg.

Application September 12, 1939, Serial No. 294,539

4 Claims. (Cl. 280—33.17)

This invention relates to trailer hitches and the like and is particularly adapted to be used in connection with automobiles and trucks.

The primary object of the invention is to provide a trailer hitch having an adjustment therein for controlling the gripping pressure of the hitch about the ball connection.

Another object of the improved hitch is to provide an eye bolt connection to be used with a bolt connection where a ball connection is not available such as in emergency cases.

A further object of this invention is to provide lock-means within the hitch requiring the use of a wrench or some other type of tool to lock or unlock the same.

Another object of my invention is to provide locking means within a trailer hitch that will maintain the hitch in locked position, even though the pivot pins connecting the mechanism together should become sheared or broken.

A further object of the invention is to provide means of controlling the holding pressure applied to the ball connection.

A still further object of the invention is the providing of means for locking the trailer hitch in locked position so that the locking mechanism cannot be manipulated without unlocking the locking mechanism.

These and other incidental objects will be apparent in the drawing, specification and claims.

Referring to the drawing:

Figure 1 is a side sectional view of my new and improved trailer hitch, parts broken away for convenience of illustration.

Figure 2 is a sectional view of the trailer hitch, parts broken away illustrating the same in unlocked position.

Figure 3 is a plan view of my new and improved trailer hitch showing the tongue of the trailer in dotted position.

Figure 4 is a sectional view, taken on line 4—4 of Figure 1, looking in the direction indicated and illustrating part of the locking mechanism.

In the drawing:

1 is the main body portion of my trailer hitch, which is secured by suitable fastening means to the tongue of the trailer 2, shown in dotted position in Figure 3. The hitch bar 3 is a part of the tractor vehicle, not here shown, and has a ball 4 mounted thereon by any suitable fastening means, such as welding, shown at 5. The ball 4 may be hollow, as illustrated at 6, reducing the cost of production.

A ball socket 7 is slidably mounted within the barrel 8 of the trailer hitch 1. The socket 7 is retained within the barrel by the adjustable nut 9 threaded within the barrel 8 at 10. A flexible cushion 11 is held between the socket 7 and the nut 9 by the spindle 12, which is a part of the socket 7. The purpose of this cushion will be later explained. The nut 9 is locked in position by the bolt 12 clamping the lugs 13 and 14 together and compressing the barrel 8 about the locking nut 9.

A special eye connection 9A is formed on the adjusting nut 9 for turning the nut and providing an eye connection to be used in cases of emergency where a ball connection is not available this is an important feature of the hitch.

A movable socket 15, bears against the ball 4 on the opposite side of the socket 7 by the action of the link 16 in relation to the bell crank 17. The bell crank 17 has a cross shaft 18 keyed therein by the key 19 and locked thereto by the set screw 20. The shaft 18 extends through the barrel 8, best illustrated in Figure 4 and has an extension 21 for coacting with a wrench or other suitable tool for rotating the shaft. The link 16 is pivotally mounted at 22 to the bell crank 17 at its one end and to the socket 15 at 23 at its opposite end. It will be noted that the pivot point 22, in Figure 1, is off-set from the center line, this causes the assembly to become locked within itself by the action of the dog 24 resting against the shoulder 25 of the link 16. It will also be noted that the end 26 of the bell crank 17 rests against the end of the slot 27 of the barrel 8, preventing further movement of the bell crank.

The bell crank 17 also bears against the web 28 at 29 providing a safety feature so that if the shaft 18 should get broken the bell crank 17 would be forced against the web 28, forcing it downward against the barrel at 30 and preventing the same from releasing the socket 15 when the bell crank and the connecting link 16 are in the position shown in Figure 1 the compression member 11 is compressed sufficient to allow a compression action against the ball 4 by the sockets 7 and 15 holding the locking mechanism to a compressed condition. The end 26 of the bell crank may be locked at the position shown in Figure 1 by a bolt passing through the hole 31 into a hole within the lug 32 holding the same in locked position.

In the operation of my new and improved trailer hitch, the opening 33 is placed over the ball 4, a wrench is applied to the end 21 of the shaft 18, the shaft is revolved in a direction that will force the link 16 towards the center line of the hitch forcing the socket 15 towards the ball 4, clamping the ball between the same and the socket 7, as shown in Figure 1. The bell crank 7 is revolved so that the pivot 22 passes the center line of the hitch, the dog 24 will then engage the shoulder 25 of the link 16 preventing further rotation of the bell crank 17, at the same time the end 26 of the crank will contact the end of the slot 34 at 27 preventing further travel also of the bell crank. The compression member 11 will maintain the sockets 7 and 15 against the ball 4 to a suitable working fit. The bell crank 17 may be locked in position, as heretofore described.

I do not wish to be limited to the particular form of mechanical embodiment, as other methods of application may be used still coming within the scope of the claims to follow.

What is claimed to be new is:

1. A trailer hitch including a hollow elongated main body, means for securing the body adjacent one end of the trailer, a connecting element carried by the trailer and including a circular terminal, a gripping element to engage one end of the circular terminal, a second gripping element to engage the opposite end of the terminal, a link extending from the second gripping element, a bell crank lever mounted for pivotal support on the body, and manually operable to remove the link to a position to force the second gripping element toward the first gripping element to thereby grip the circular terminal of the tractor gripping element, a stop carried by the body to limit operative movement of the bell crank lever in the event the pivotal support of the bell crank lever becomes ineffective, and an opening formed in the body to permit manual pressure on the bell crank lever in the event of the inoperativeness of the pivot of the bell crank lever.

2. A trailer hitch including a hollow elongated main body, means for securing the body adjacent one end to the trailer, a connecting element carried by the trailer and including a circular terminal, a gripping element to engage one end of the circular terminal, a second gripping element to engage the opposite end of the terminal, a link extending from the second gripping element, a bell crank lever mounted for pivotal support on the body, and manually operable to remove the link to a position to force the second gripping element toward the first gripping element to thereby grip the circular terminal of the tractor gripping element, means for limiting movement of the bell crank lever in operative adjustment in the event of failure of the pivotal support, the ends of the bell crank lever remote from the link passing through an opening in the body and being formed with an opening to register with the opening in the body for the reception of a locking bolt.

3. A construction as defined in claim 1 wherein the bell crank lever is open to manual pressure to move the lever to operative position in the event of the failure of the pivotal support of the bell crank lever, one end of the bell crank lever being formed to cooperate with and interlock with the body during such manual pressure for limiting the movement of the bell crank lever.

4. A construction as defined in claim 1 wherein means are provided for longitudinally adjusting the first mentioned gripping member, and an intermediate flexible section is interposed between the adjusting means and the said gripping member to insure a proper working connection between the gripping members and the circular terminal of the tractor element.

JOHN A. RASMUSSEN.